(12) United States Patent
Tang et al.

(10) Patent No.: US 8,095,140 B2
(45) Date of Patent: Jan. 10, 2012

(54) REGROUPING WIRELESS DEVICES

(75) Inventors: Song Kean Tang, Georgetown (MY);
Kean Huat Khoo, Gelugor (MY); Tee Peng Quah, Penang (MY)

(73) Assignee: Motorola Solutions, Inc., Schaumburg, IL (US)

( * ) Notice: Subject to any disclaimer, the term of this patent is extended or adjusted under 35 U.S.C. 154(b) by 489 days.

(21) Appl. No.: 11/389,929

(22) Filed: Mar. 27, 2006

(65) Prior Publication Data

US 2007/0225004 A1    Sep. 27, 2007

(51) Int. Cl.
*H04W 72/04* (2009.01)
*H04W 24/00* (2009.01)
*H04W 4/08* (2009.01)
*H04W 4/22* (2009.01)
*H04M 11/04* (2006.01)

(52) U.S. Cl. ..... 455/450; 455/519; 455/521; 455/456.1; 455/404.1; 370/329; 370/341

(58) Field of Classification Search .................. 455/450, 455/521, 518–519, 404.1–404.2
See application file for complete search history.

(56) References Cited

U.S. PATENT DOCUMENTS

| | | | |
|---|---|---|---|
| 5,025,442 A | 6/1991 | Lynk | |
| 5,737,685 A | 4/1998 | Locascio et al. | |
| 5,969,673 A * | 10/1999 | Bickley et al. | 342/357.09 |
| 6,212,393 B1 * | 4/2001 | Suarez et al. | 455/456.4 |
| 6,226,510 B1 * | 5/2001 | Boling et al. | 455/404.2 |
| 6,545,995 B1 * | 4/2003 | Kinnunen et al. | 370/341 |
| 6,591,112 B1 * | 7/2003 | Siccardo et al. | 455/521 |
| 6,661,878 B1 | 12/2003 | Mirashrafi et al. | |
| 7,436,785 B1 * | 10/2008 | McMullen et al. | 370/261 |
| 2001/0006519 A1 | 7/2001 | Voit | |
| 2002/0183075 A1 * | 12/2002 | Fauconnier | 455/456 |
| 2003/0083086 A1 | 5/2003 | Toyryla | |
| 2003/0153339 A1 | 8/2003 | Crockett et al. | |
| 2004/0002346 A1 * | 1/2004 | Santhoff | 455/456.1 |
| 2004/0102204 A1 * | 5/2004 | Bar-On | 455/517 |
| 2004/0174880 A1 | 9/2004 | White | |
| 2004/0203907 A1 * | 10/2004 | Hiller et al. | 455/519 |

(Continued)

FOREIGN PATENT DOCUMENTS

WO    WO 9722940 A1 *    6/1997

(Continued)

OTHER PUBLICATIONS

PCT Search Report Dated Nov. 15, 2007.

(Continued)

*Primary Examiner* — Nick Corsaro
*Assistant Examiner* — Tangela T. Chambers
(74) *Attorney, Agent, or Firm* — Terry Hughes Smith; Anthony P. Curtis; Daniel R. Bestor

(57) ABSTRACT

The present invention provides a method of switching a number of wireless devices to a common channel. The method comprises automatically broadcasting location coordinates for an initiator wireless devices to the other wireless devices in response to receiving an initiate switching message comprising the location coordinates from the initiator wireless device; automatically determining the distance between each of the other wireless device and the initiator wireless device in response to receiving respective location based information from the other wireless devices; and transmitting an instruction to switch to the common channel to the initiator wireless device and the other wireless devices within a predetermined distance of the initiator wireless device.

21 Claims, 4 Drawing Sheets

U.S. PATENT DOCUMENTS

| | | | |
|---|---|---|---|
| 2005/0113113 A1* | 5/2005 | Reed | 455/456.3 |
| 2005/0143093 A1* | 6/2005 | Kim et al. | 455/456.1 |
| 2005/0235278 A1 | 10/2005 | Wu et al. | |
| 2005/0265326 A1* | 12/2005 | Laliberte | 455/404.1 |
| 2007/0037596 A1* | 2/2007 | Shaffer et al. | 455/518 |
| 2007/0049314 A1* | 3/2007 | Balachandran et al. | 455/518 |
| 2008/0076410 A1* | 3/2008 | Beyer | 455/425 |

FOREIGN PATENT DOCUMENTS

| | | |
|---|---|---|
| WO | 20050235278 A1 | 9/2005 |

OTHER PUBLICATIONS

EPC Search Report Dated Apr. 19, 2011.

* cited by examiner

US 8,095,140 B2

REGROUPING WIRELESS DEVICES

FIELD OF THE INVENTION

The present invention relates generally to the field of grouping wireless devices onto a common channel, for example in but not limited to an emergency situation.

BACKGROUND OF THE INVENTION

Grouping of various wireless communications devices, such as two-way radios and/or cellular mobile phones, onto a common channel, such as a special talk channel, can be useful in various situations including emergencies. For example emergency services personal such as police, fire fighters and ambulance crew may wish to communicate with each other over a common radio channel in order to coordinate activities. Typically the grouping of their wireless devices is based on proximity or location, so that for example a wounded police officer may request assistance and the nearest police officers to their wounded colleague may have their wireless communications devices switched to a common channel in order to talk with each other and the wounded officer in order to coordinate that assistance.

Examples of communications systems in which these special talk groups are used include Terrestrial Trunked Radio (TETRA) and Association of Public Safety Communications Officials (APCO) systems. TETRA handsets use professional mobile radio (PMR), direct-mode or walkie-talkie type two-way radio communications as well as cellular voice and data services, such as those provided by Global System for Mobile Communications (GSM), code division multiple access (CDMA), and universal mobile telecommunications system (UMTS) networks. PMR is a trunked or cellular based network approach which provides call services such as one-to-many calls and which is more robust than typical commercial cellular systems such as GSM.

A problem with the above described approach, however, is that a network manager or console operator is required to manually perform the re-grouping function in order to switch all the relevant wireless devices to the common channel. This requires the operator to identify surrounding peers and to send a dynamic regrouping command to the wireless devices of those peers.

BRIEF DESCRIPTION OF THE DRAWINGS

In order that the invention may be readily understood and put into practical effect, reference will now be made to exemplary embodiments as illustrated with reference to the accompanying figures, where like reference numerals refer to identical or functionally similar elements throughout the separate views. The figures together with a detailed description below, are incorporated in and form part of the specification, and serve to further illustrate the embodiments and explain various principles and advantages, in accordance with the present invention where.

Figure 1:
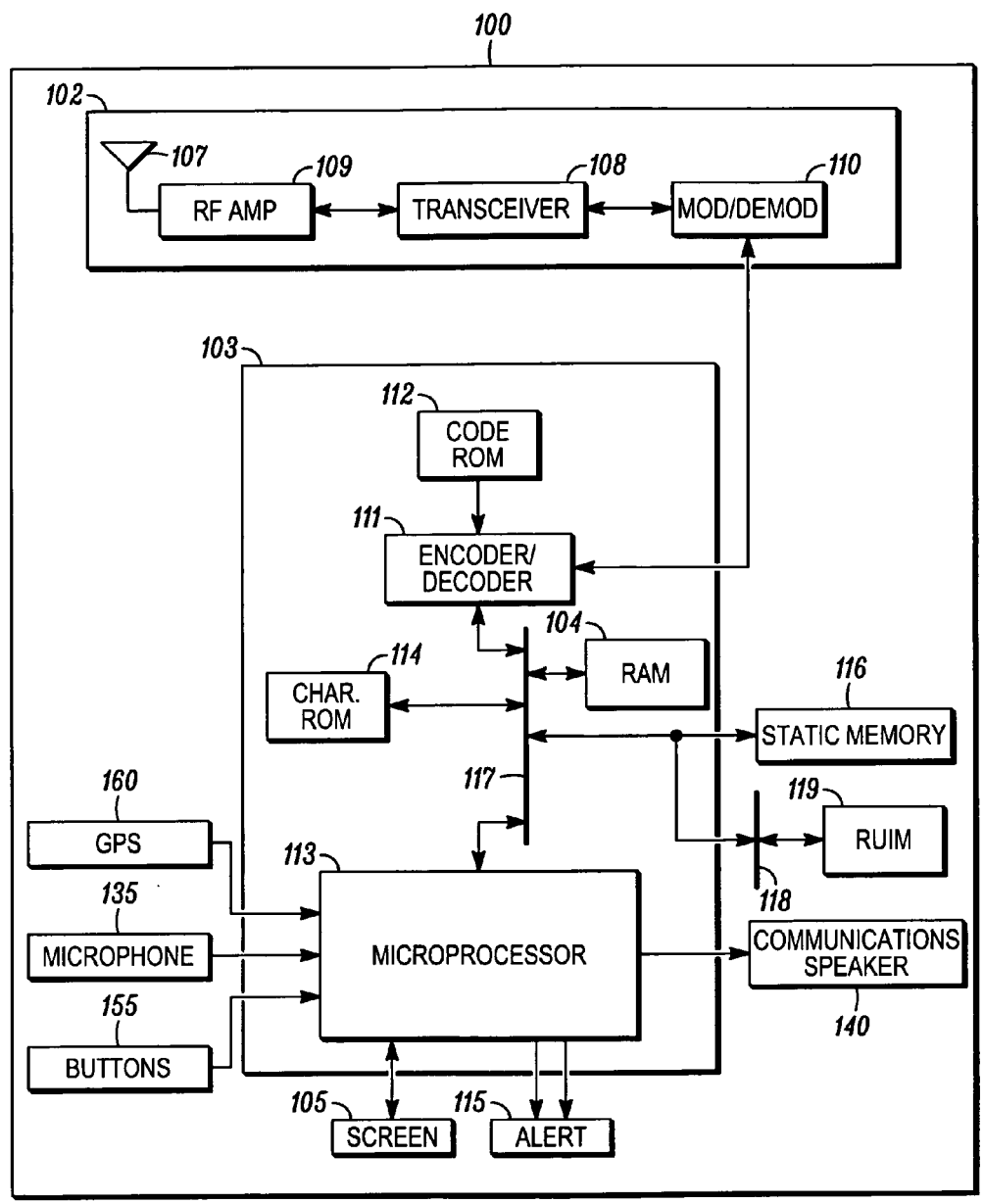
FIG. 1 is a schematic block diagram illustrating circuitry of a wireless device in accordance with the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

Before describing in detail embodiments that are in accordance with the present invention, it should be observed that the embodiments reside primarily in combinations of method steps and apparatus components related to regrouping wireless devices onto a common channel. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. Also, throughout this specification, the term "key" has the broad meaning of any key, button or actuator having a dedicated, variable or programmable function that is actuatable by a user. It will be appreciated that embodiments of the invention described herein may be comprised of one or more conventional processors and unique stored program instructions that control the one or more processors to implement, in conjunction with certain non-processor circuits, some, most, or all of the functions of regrouping wireless devices onto a common channel described herein. The non-processor circuits may include, but are not limited to, a radio receiver, a radio transmitter, signal drivers, clock circuits, power source circuits, and user input devices. As such, these functions may be interpreted as steps of a method for regrouping wireless devices onto a common channel. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

In general terms, in one aspect, the present invention provides a method of automatically switching a number of wireless devices to the same channel as an initiator wireless device by determining which of the other wireless devices are within a predetermined distance of the initiator wireless device and transmitting an instruction to switch to the common channel to the initiator wireless device and the other wireless device within the predetermined distance of the initiator wireless device. The predetermined distance could be determined using the global positioning system (GPS) locations of each of the wireless devices for example.

In an embodiment, the initiator wireless device signals a central radio control manager, which in response, broadcasts an initiate switching message to other wireless devices. The message can include the location coordinates (for example GPS) of the initiator wireless device in order that the other wireless devices can calculate their respective distances from the initiator wireless device using their own location coordinates. The other wireless devices within a predetermined distance of the initiator wireless device then respond to the radio control manager which signals them and the initiator wireless device to switch to a common channel. The response from the other wireless device can be in the form of location based information, which might include GPS coordinates, the distance between the respective other wireless device and the initiator wireless device, or simply whether the other wireless device is within a predetermined distance of the initiator wireless device.

The common channel may be a duplex de-centralized radio channel, such as a two-way radio channel or a cellular based channel such as a TETRA or an UMTS channel for example. The signalling between the wireless devices in order to implement the common channel grouping may be implemented using a different wireless technology from the common channel, for example, a cellular data service, such as short message service (SMS) over GSM over which messages are exchanged.

In an alternative embodiment, instead of the location coordinates for the initiator wireless device being forwarded to the other wireless devices, the radio control manager may simply request the other wireless devices to forward their respective location coordinates so that the radio location manager can determine the distance between each of the other wireless devices and the initiator wireless device. The radio control manager then signals the initiator wireless devices and the other wireless devices which are within a predetermined distance of the initiator wireless device to switch to a common channel.

There is also provided a method of operating a wireless device to be the initiator wireless device by sending an initiate switching message to the radio control manager together with its location coordinates in response to receiving a corresponding user initiated input such as pressing an emergency button on the device for example.

There is also provided a method of operating a wireless device to be one of the other wireless devices which receive the broadcast from the radio control manager. The wireless device may then be configured to either respond with its location coordinates, or receive the location coordinates of the initiator wireless device and determine the distance to this; the other wireless device then sends either this determined distance or an indication that it is within a predetermined distance of the initiator device to the radio control manager. The wireless device then switches to a common channel in response to receiving an instruction from the radio control manager to switch to the common channel.

There is also provided a method of operating a wireless device in order to switch to a common channel, the method comprising: receiving a broadcast of the location coordinates of an initiator wireless device from a radio control manager and automatically switching to the common channel in response to determining that the wireless device is within a predetermined distance of the initiator wireless device.

There is also provided a wireless device having a wireless transceiver, a user actuatable control surface such as a hardware control or button or a programmable soft button, and a processor arranged to transmit an initiate switching message comprising location coordinates for the initiator wireless device to a radio control manager in response to receiving a corresponding user initiated input on the user actuatable control surface. The processor is further arranged to switch the device to a common channel in response to receiving an instruction to switch to the common channel from the radio control manager.

The common channel may be a PMR, commercial cellular (e.g., GSM, UMTS, CDMA 2000) or two-way radio channel, and communications with the radio control manager may use a different channel. In an embodiment, a TETRA PMR network is used for the common channel, and a cellular network such as GSM based SMS messaging for signalling to set up the group of wireless devices to use the common channel.

There is also provided a radio control manager apparatus for switching a number of wireless devices to a common channel. The apparatus comprises a means for broadcasting the location coordinates for an initiator wireless devices to the other wireless devices in response to receiving an initiate switching message comprising the location coordinates from an initiator wireless device and a means for automatically determining the distance between each of the other wireless devices and the initiator wireless device in response to receiving respective location based information from the other wireless devices. The apparatus further comprises a means for transmitting an instruction to switch to the common channel to the initiator wireless device and the other wireless devices within a predetermined distance of the initiator wireless device. The apparatus will typically be implemented as computer based equipment such as a server, and the various means being implemented by suitable software or computer programming.

The location based information may be the respective distances from each other wireless device to the initiator wireless device, or an indication that the respective other devices are within a predetermined distance of the initiator device, or the respective location coordinates such as GPS coordinates for each of the other wireless devices.

There is also provided a wireless device comprising a radio transceiver and a processor arranged to automatically transmit location based information dependent on the location coordinates for the wireless device to a radio control manager in response to receiving a broadcast of the location coordinates of an initiator wireless device from the radio control manager and automatically switching to the common channel in response to receiving an instruction to switch to the common channel from the radio control manager. The processor may be further arranged to calculate the distance between said wireless device and the initiator wireless device.

There is also provided a radio control manager arranged to automatically broadcast a request for location coordinates message to the other wireless devices in response to receiving an initiate switching message comprising location based information from an initiator wireless device and to automatically determine the distance between each of the other wireless devices and the initiator wireless device in response to receiving respective location coordinates from the other wireless devices, and further to transmit an instruction to switch to the common channel to the initiator wireless device (e.g., R2)

and the other wireless devices within a predetermined distance of the initiator wireless device.

There is also provided a wireless device having a transceiver and a processor arranged to automatically transmit location coordinates for the wireless device to a radio control manager in response to receiving a broadcast request for location coordinates message from a radio control manager, and to automatically switch to the common channel in response to receiving an instruction to switch to the common channel from the radio control manager.

There is also provided a wireless device having a transceiver and a processor arranged to receive a broadcast of the location coordinates of an initiator wireless device from a radio control manager and to automatically switch to the common channel in response to determining that the wireless device is within a predetermined distance of the initiator wireless device.

In another aspect of the present invention there is provided an electronic device, and/or a computer program which when executed on a suitable processor is, arranged to carry out the methods described herein. Let us now refer to the figures and describe the invention in greater detail.

Referring to FIG. 1, there is a schematic diagram illustrating a wireless device 100, typically in the form of a mobile station or mobile telephone comprising a radio frequency communications unit 102 coupled to be in communication with a processor 103. The radio frequency communications unit 102 may be configured for dual operation cellular radio communications such as TETRA or another PMR system and GSM for example, as well as two-way radio communications. The wireless device 100 also has a display screen 105. There is also an alert module 115 that typically contains an alert speaker, vibrator motor and associated drivers. The display screen 105, and alert module 115 are coupled to be in communication with the processor 103.

The processor 103 includes an encoder/decoder 111 with an associated code read only memory (ROM) 112 for storing data for encoding and decoding voice or other signals that may be transmitted or received by the wireless device 100. The processor 103 also includes a microprocessor 113 coupled, by a common data and address bus 117, to the encoder/decoder 111, a character ROM 114, a random access memory (RAM) 104, static programmable memory 116 and a removable user identity module (RUIM) interface 118. The static programmable memory 116 and a RUIM card 119 (commonly referred to as a subscriber identity module (SIM) card) operatively coupled to the RUIM interface 118 each can store, amongst other things, preferred roaming lists (PRLs), subscriber authentication data, selected incoming text messages and a telephone number database (TND phonebook) comprising a number field for telephone numbers and a name field for identifiers associated with one of the numbers in the name field. The RUIM card 119 and static memory 116 may also store passwords for allowing accessibility to password-protected functions on the mobile telephone 100.

The microprocessor 113 has ports for coupling to the display screen 105, and the alert module 115. Also, microprocessor 113 has ports for coupling to a microphone 135 and a communications speaker 140 that are integral with the device.

The display screen 105 may include soft or programmable buttons or other user actuatable surfaces or mechanisms such as voice recognition for initiating a special talk group or other functionality within the wireless device 100. Alternatively or additionally, the wireless device 100 may include dedicated or reconfigurable hardware buttons or controls 155.

The wireless device 100 also includes a GPS module 160 used to locate the wireless device 100 using a constellation of satellites as is well known.

The character ROM 114 stores code for decoding or encoding text messages that may be received by the communications unit 102. In this embodiment, the character ROM 114, the RUIM card 119, and the static memory 116 may also store operating code (OC) for the microprocessor 113 and code for performing functions associated with the mobile telephone 100.

The radio frequency communications unit 102 is shown for simplicity as a single operation unit, but typically multiple radio frequency communications units 102 will be included in the wireless device 100 in order to enable multiple communications modes, such as TETRA, GSM, and direct mode radio communications. Each radio frequency communications unit 102 is a combined receiver and transmitter having a common antenna 107. The communications unit 102 has a transceiver 108 coupled to the antenna 107 via a radio frequency amplifier 109. The transceiver 108 is also coupled to a combined modulator/demodulator 110 that couples the communications unit 102 to the processor 103.

Figure 2:
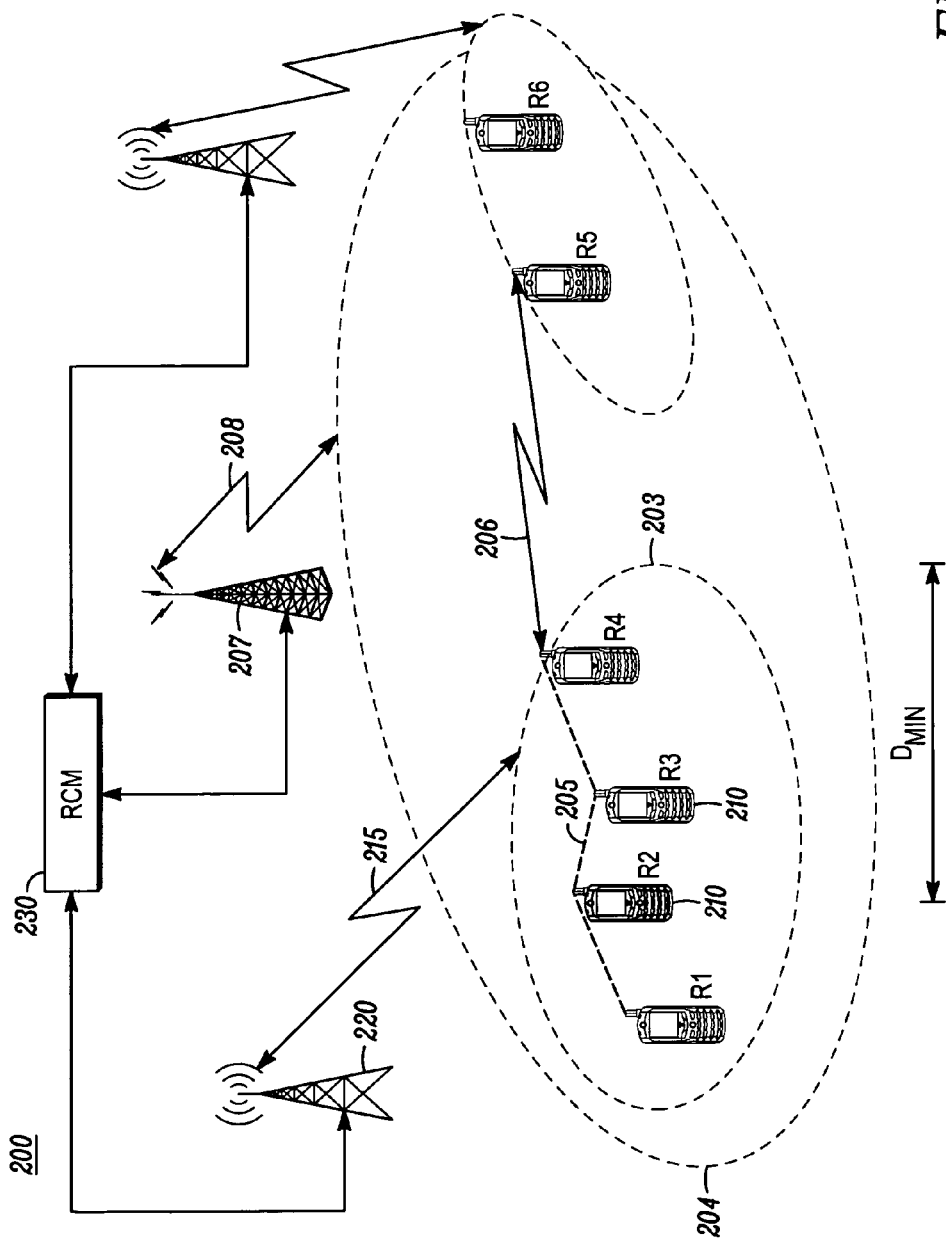
FIG. 2 is a schematic block diagram illustrating a system in accordance with an embodiment of the invention.

FIG. 2 shows a wireless communications system according to an embodiment. The wireless communications system 200 has a number of wireless devices 210 such as cellular and/or two-way radio handsets, for example TETRA handsets, which are coupled by a commercial cellular air-interface 215, such as GSM, to one of a number of commercial cellular (e.g., GSM) base stations 220 each supporting a commercial cellular cell 203. The handsets are also coupled by a PMR air interface 208, such as TETRA, to a number of PMR base stations 207. The handsets can also be coupled to each other using a two-way radio air interface 206. The cellular and PMR base stations 220 and 207 are coupled to a central radio control manager 230.

The two-way radio interface 206, the cellular air interface 215, or the PMR air interface 208 can be used to provide a common channel 205 for an emergency channel or special talk group amongst the wireless devices 210. The radio control manager 230 is used to group or regroup which wireless devices are grouped together on the common channel 205, and the control signalling for carrying this out can be carried out at least partially over a different air interface. Typically the common channel is supported by the PMR network including PMR air interfaces 208 and base stations 207, and some control signalling is carried over the cellular network of the cellular air-interface 215, base stations 220 and the cellular network which is not shown for clarity but which will be well known to those skilled in the art. Similarly the PMR network such as a TETRA network is not shown for simplicity but will be well known to those skilled in the art. Both the cellular and the PMR network are coupled to the radio control manager 230.

In response to one of the wireless devices (R2—the initiator wireless device) initiating a regrouping by sending an initiate switching message, the radio control manager 230 automatically determines the other wireless devices (R1, R3, and R4) that are the closest and signals these together with the initiator wireless device (R2) to switch to a common channel 205, typically provided by the PMR radio air interface 208. Determining which other wireless devices are sufficiently close to the initiator wireless device can be achieved using GPS location coordinates for each of the wireless devices and calculating the differences between them. Thus, in this embodiment, each of the handsets or wireless devices includes GPS capability. Other location coordinate determining mechanisms may alternatively or additionally be used.

Figure 3:
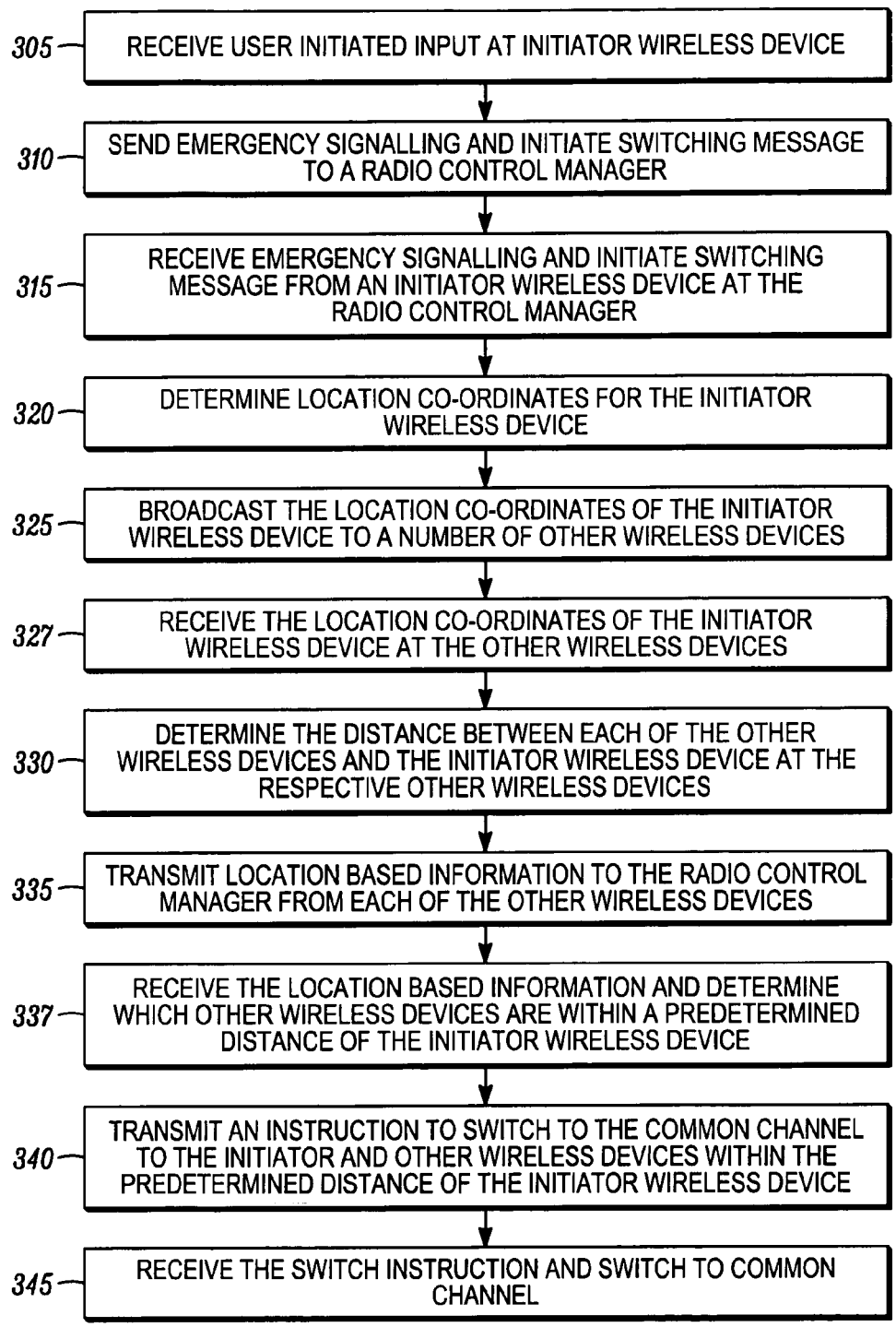
FIG. 3 is a flow diagram illustrating a method of operating the system of FIG. 2 in accordance with an embodiment of the invention.
Figure 4:
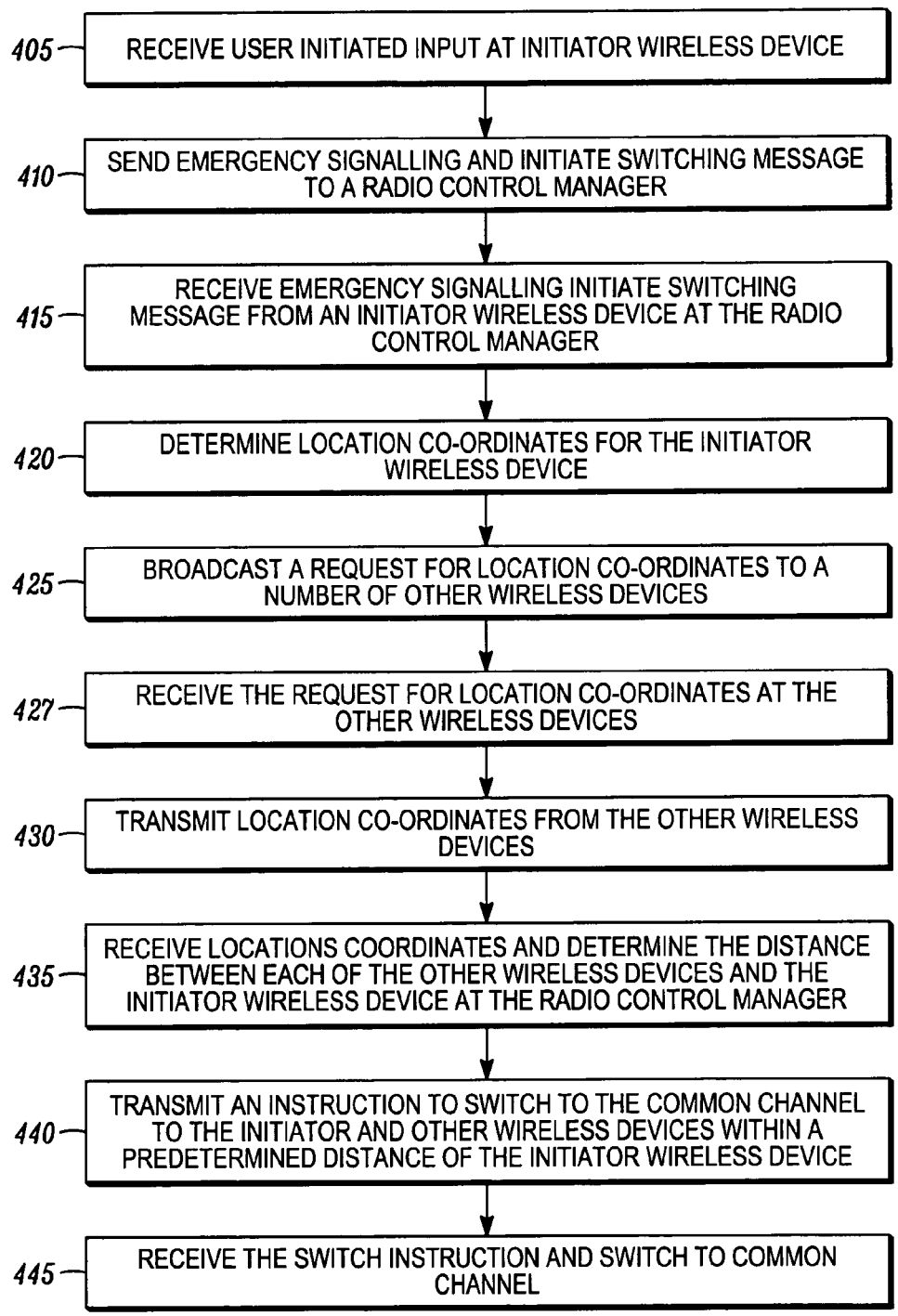
FIG. 4 is a flow diagram illustrating a method of operating the system of FIG. 2 in accordance with another embodiment of the invention.

Various mechanisms for achieving the regrouping or switching to a common channel between proximate wireless devices could be used, and two embodiments are described with respect to FIGS. 3 and 4.

FIG. 3 shows a flow diagram for a method (300) of operating the system of FIG. 2. When the user of one of the wireless devices 210 (R2) wants to initiate a new special talk group to coordinate an emergency situation, for example, the user activates a suitable input on their wireless device 210 such as pressing an emergency button (305). The initiator wireless device 210 (R2) then transmits a predetermined emergency signal for example using the TETRA emergency protocol signalling, together with an initiate switching message to the radio control manager 230 (310). The emergency signal is typically sent via the PMR air interface 208 and the PMR base station 207. The initiate switching message may be achieved by sending a predefined SMS or other cellular data service message via the cellular air-interface 215 and base station 220. The initiate switching message includes the GPS location coordinates of the initiator wireless device 210 (R2). In some embodiments, the initiate switching message may be sent without the predetermined emergency signal.

The radio control manager 230 receives the standard emergency signal via the PMR network and the initiate switching message (315) via the cellular network from the initiator wireless device 210 (R2), and determines the location coordinates of the initiator wireless device (320). This may simply involve reading the GPS coordinates from the predefined SMS initiate switching message. The radio control manager then broadcasts the location coordinates of the initiator wireless device (R2) to the other wireless devices (R1, R3, R4, R5, and R6) (325). The broadcast may be in the form of an SMS message broadcast over the cellular air interface 215. The other wireless devices 210 to which the broadcast is transmitted may be limited in some way, for example to those other wireless devices (R1, R3, and R4) in the same cell (cellular 203 or PMR 204, or both) as the initiator wireless device (R2); or additionally adjacent cells. The broadcast message may also include a radius or predetermined minimum distance $D_{min}$ together with a special talk group number. The special talk group number can be used to distinguish between multiple groupings of wireless devices for example.

Each of the other wireless devices (R1, R3, R4) receives the broadcast message from the radio control manager 230 (327) and determines the distance between itself and the initiator wireless device (R2) (330). For example the respective GPS latitude and longitude values can simply be subtracted, or used to calculate a straight line distance to the initiator wireless device (R2). The other wireless devices (R1, R3, R4) can then be configured to respond to the radio control manager 230 only if they are within a predetermined distance ($D_{min}$) of the initiator wireless device (335), again using SMS messaging for example. Alternatively all of the other wireless devices 210 receiving the radio control manager broadcast may respond with their calculated distances to the initiator wireless device (R2), or simply that they are or are not within the predetermined distance $D_{min}$. Whichever option is chosen, this location based information is transmitted from respective other wireless devices to the radio control manager.

The radio control manager receives this location based information (337) and determines which of the other devices are within a predetermined distance $D_{min}$ of the initiator wireless device (337). This may be based on distances transmitted from the other wireless devices or simply their indications that they are or are not within $D_{min}$.

The radio control manager 230 then transmits a switch to common channel message to the initiator wireless device and the other wireless devices within the predetermined distance $D_{min}$ (340) in order to group or regroup the wireless devices into a special talk group. A dynamic regrouping command may be used in a TETRA system. The initiator wireless device and the other wireless devices within the predetermined distance $D_{min}$ then receive this message and switch to the common channel 205 (345) such that their respective users can then communicate quickly and effectively with each other both individually and on a group basis. As an alternative to a common PMR radio channel, a cellular push-to-talk type of channel or a walkie-talkie or direct mode radio channel may be used depending on the configuration of the wireless communications system.

This method provides automatic dynamic regrouping of wireless devices into temporary special talk groups which is typically faster and more reliable than using human intervention, for example in the form of a network manager. Further, the use of GPS or other automatically generated location coordinates for the various wireless devices involved provides a more accurate location based grouping, instead of relying on the memory and knowledge of their surroundings of the users of the wireless devices for example. Furthermore, this method can be implemented without additional hardware in many existing systems such as TETRA; it is also simple and cost effective to implement and operate.

Using SMS as the signalling or control channel for transferring these messages provides a low cost solution as it requires no additional hardware and provides faster overall execution of the method.

The method may be used in emergency situations such as police officers involved in a robbery, or it may be used in non-emergency situations such as engineers inspecting equipment or sites, or even social groups convening about a town centre for example.

In an alternative to the above described embodiment, the radio control manager 230 may broadcast the initiator wireless device location coordinates only, without the distance threshold $D_{min}$, which may be preconfigured in the other wireless devices. In a further alternative, the broadcast may include the common channel, so that those other wireless devices which determine themselves to be within the predetermined minimum distance $D_{min}$ can automatically switch to the common channel. The common channel will also need to be transmitted to the initiator wireless device in this configuration by the radio control manager.

FIG. 4 shows a flow diagram for another method (400) of operating the system of FIG. 2. When the user of one of the wireless devices 210 (R2) wants to initiate a new special talk group to coordinate an emergency situation for example, the user activates a suitable input on their wireless device 210 such as pressing an emergency button (405) as previously described. The initiator wireless device 210 (R2) then transmits an emergency signal (for example a TETRA message) together with an initiate switching message for example using an SMS message including the wireless device's GPS coordinates to the radio control manager 230 (410). The radio control manager 230 receives the emergency signal and the initiate switching message (415) from the initiator wireless device 210 (R2), and determines the location coordinates of the initiator wireless device (420). Typically this simply involves reading the GPS coordinates from the predefined SMS initiate switching message.

The radio control manager 230 then broadcasts a request for location coordinates from the other wireless devices (R1, R3, R4, R5, and R6) (425); typically in the form of an SMS message broadcast. The other devices 210 to which the broadcast is transmitted may be limited in some way, for example to those other wireless devices (R1, R3, and R4) in the same (and also possibly adjacent) cell as the initiator wireless device (R2). The broadcast message may also include a special talk group number which can be used to distinguish between multiple groupings of wireless devices such as multiple emergency situations for example.

Each of the other wireless devices (R1, R3, R4) receives the request (427) and responds by transmitting their own location coordinates such as their GPS coordinates to the radio control manager (430). Again this may be achieved using a predetermined SMS message. The radio control manager 230 then receives these coordinates from the respective other devices and determines the distances between the various other wireless devices (R1, R3, R4) and the initiator wireless device (R2) (435); and in particular which other wireless devices (R1, R3, R4) are within a predetermined distance $D_{min}$ of the initiator wireless device (R2).

The radio control manager 230 then transmits a switch to common channel message to the initiator wireless device and the other wireless devices within the predetermined distance $D_{min}$ (440) in order to group or regroup the wireless devices into a special talk group. A dynamic regrouping command may be used in a TETRA system. The initiator wireless device and the other wireless devices within the predetermined distance $D_{min}$ then receive this instruction and switch to the common channel 205 (445) such that their respective users can then communicate quickly and effectively with each other either individually or on a group basis. As an alternative to a common PMR radio channel, a cellular or walkie-talkie push-to-talk type of channel may be used depending on the configuration of the wireless communications system.

The method of FIG. 4 provides similar advantages to the method of FIG. 3. Additionally, the processing required to calculate the distance between the various other wireless devices and the initiator wireless device is performed by the radio control manager 230, thus relieving the other wireless devices from this task.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims.

The skilled person will recognise that the above-described apparatus and methods may be embodied as processor control code, for example on a carrier medium such as a disk, compact disc (CD)- or digital video disc (DVD)-ROM, programmed memory such as ROM (firmware), or on a data carrier such as an optical or electrical signal carrier. For many applications embodiments of the invention will be implemented on a digital signal processor (DSP), ASIC or field programmable gate array (FPGA). Thus the code may comprise conventional programme code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or very high speed integrated circuit hardware description language (VHDL). As the skilled person will appreciate, the code may be distributed between a plurality of coupled components in communication with one another. Where appropriate, the embodiments may also be implemented using code running on a field-(re)programmable analogue array or similar device in order to configure analogue hardware.

We claim:

1. A method of operating an initiator wireless device in order to initiate switching of the initiator wireless device and a number of other wireless devices to a common traffic channel, the method comprising:
automatically transmitting to a radio control manager an initiate switching message comprising location coordinates for the initiator wireless device in response to receiving a corresponding user initiated input, the initiate switching message initiating an automatic regrouping of the initiator and other wireless devices; and
automatically switching the initiator wireless device from a traffic channel on which the initiator wireless device was transmitting to the common traffic channel forming the talkgroup in response to receiving an instruction, based on the location coordinates and the initiate switching message, to switch to the common traffic channel from the radio control manager.

2. The method as claimed in claim 1, wherein the common channel is a professional mobile radio (PMR) radio channel, and wherein communications with the radio control manager use a cellular network.

3. The method as claimed in claim 2, wherein the location coordinates are global positioning system (GPS) coordinates, and wherein communications with the radio control manager uses short message service (SMS) messages.

4. The method as claimed in claim 1, wherein the instruction comprises a special talkgroup number that is dependent on the type of emergency situation in which the initiator wireless device is engaged.

5. The method as claimed in claim 1, wherein the automatic switching switches the initiator wireless device from an original talkgroup in which the initiator wireless device was communicating with a set of wireless devices that are not necessarily proximate to the initiator wireless device to a new talkgroup containing a different set of wireless devices that are all proximate to the initiator wireless device.

6. The method as claimed in claim 1, wherein transmission of the initiate switching message is initiated by activating an input dedicated to activating the initiate switching message on the initiator wireless device.

7. The method as claimed in claim 1, wherein in response to the user initiated input, a predetermined emergency signal is transmitted in addition to the initiate switching message.

8. The method as claimed in claim 1, wherein the location coordinates define a center of a predetermined radius within which wireless devices are automatically switched to the common traffic channel and outside of which wireless devices are not automatically switched to the common traffic channel.

9. A method of switching a number of wireless devices to a common traffic channel, the method comprising:
in response to receiving an initiate switching message comprising location coordinates from an initiator wireless device, automatically broadcasting the location coordinates for the initiator wireless device to other wireless devices, the initiate switching message initiating an automatic regrouping of the initiator and the other wireless devices;

automatically determining the other wireless devices which are within a predetermined distance of the initiator wireless device as determined by the location coordinates from the initiator wireless device and in response to receiving respective location based information from the other wireless devices; and transmitting an instruction to switch from traffic channels on which the initiator wireless device and the other wireless devices were transmitting to the common traffic channel to the initiator wireless device and the other wireless devices within the predetermined distance of the initiator wireless device, whereby the other wireless devices and the initiator wireless device are enabled to communicate with each other using the common traffic channel.

10. The method as claimed in claim 9, wherein the location based information are the respective distances from each of the other wireless devices to the initiator wireless device.

11. The method as claimed in claim 9, wherein the common traffic channel is a professional mobile radio (PMR) radio channel, and wherein communications with the other wireless devices use a cellular network.

12. The method as claimed in claim 11, wherein the location coordinates are global positioning system (GPS) coordinates, and wherein communications with the other wireless devices use short message service (SMS) messages.

13. The method as claimed in claim 11, wherein the broadcast is limited to the other wireless devices using the same or adjacent cell as the initiator wireless device.

14. A method of operating a wireless device in order to switch to a common traffic channel, the method comprising:
receiving a broadcast of location coordinates of an initiator wireless device from a radio control manager; and
automatically switching from a traffic channel on which the wireless device was transmitting to the common traffic channel in response to determining that the wireless device is within a predetermined distance of the initiator wireless device based on the location coordinates of the initiator wireless device and location coordinates of the wireless device, whereby the wireless device and the initiator wireless device are enabled to communicate with each other using the common traffic channel.

15. The method as claimed in claim 14, further comprising automatically transmitting location based information dependent on location coordinates for the wireless device to the radio control manager in response to receiving the broadcast of the location coordinates of the initiator wireless device, wherein automatically switching to the common traffic channel is in response to receiving an instruction to switch to the common traffic channel from the radio control manager.

16. The method as claimed in claim 15 further comprising calculating the distance between the wireless device and the initiator wireless device, wherein the location based information is the calculated distance.

17. The method as claimed in claim 15, wherein the location based information are the location coordinates for the wireless device.

18. The method as claimed in claim 15, wherein the common traffic channel is a professional mobile radio (PMR) radio channel, and wherein communications with the radio control manager are over a cellular network.

19. The method as claimed in claim 18, wherein the location coordinates are global positioning system (GPS) coordinates, and wherein communications with the radio control manager use short message service (SMS) messages.

20. The method as claimed in claim 14, further comprising:
calculating a current location of the wireless device;
using the calculated location and the received location coordinates to determine if the wireless device is within the predetermined distance of the initiator wireless device; and
receiving the common traffic channel of the initiator wireless device.

21. A method of switching a number of wireless devices to a common traffic channel, the method comprising:
in response to receiving an initiate switching message comprising location based information from an initiator wireless device, automatically broadcasting a request for location coordinates message to other wireless devices, the initiate switching message initiating an automatic regrouping of the initiator and other wireless devices;
automatically determining a distance between each of the other wireless devices and the initiator wireless device in response to receiving respective location coordinates from the other wireless devices and the location based information from the initiator wireless device; and
transmitting an instruction to switch from traffic channels on which the initiator wireless device and the other wireless devices were transmitting to the common traffic channel to the initiator wireless device and the other wireless devices within a predetermined distance of the initiator wireless device, whereby the other wireless devices and the initiator wireless device are enabled to communicate with each other using the common traffic channel.

* * * * *

UNITED STATES PATENT AND TRADEMARK OFFICE
CERTIFICATE OF CORRECTION

| | | |
|---|---|---|
| PATENT NO. | : 8,095,140 B2 | Page 1 of 1 |
| APPLICATION NO. | : 11/389929 | |
| DATED | : January 10, 2012 | |
| INVENTOR(S) | : Tang et al. | |

It is certified that error appears in the above-identified patent and that said Letters Patent is hereby corrected as shown below:

On the Title Page, in Item (74), under "Attorney, Agent, or Firm", in Column 2, Line 1, delete "Terry" and insert -- Terri --, therefor.

Signed and Sealed this
Eighteenth Day of December, 2012

David J. Kappos
*Director of the United States Patent and Trademark Office*